UNITED STATES PATENT OFFICE.

PHILIPPE AUGUSTE GUYE, OF GENEVA, SWITZERLAND, ASSIGNOR TO FERDINAND GROS & BOUCHARDY, OF PARIS, FRANCE, A FIRM.

MANUFACTURE OF CONCENTRATED NITRIC ACID.

1,348,873.      Specification of Letters Patent.      Patented Aug. 10, 1920.

No Drawing.      Application filed May 9, 1918. Serial No. 233,567.

*To all whom it may concern:*

Be it known that I, PHILIPPE AUGUSTE GUYE, a citizen of the Swiss Republic, residing in Geneva, Switzerland, have invented a certain new and useful Improved Manufacture of Concentrated Nitric Acid, of which the following is a specification.

There are a number of patents for the manufacture of concentrated nitric acid starting with $NO_2$ and water or dilute nitric acid. By the reaction of the $NO_2$ vapors with water an acid of only about 60% strength is obtained; by using liquid $NO_2$ concentrations of about 90% are obtained. These do not produce 100% nitric acid.

The present invention relates to a process for the manufacture of very highly concentrated nitric acid by causing the reaction of nitric acid, of a concentration such as is obtained by means of the processes above referred to or of any other desired or available concentration, with nitric anhydrid. In view of the extremely rapid decomposition of the $N_2O_5$ the reaction is advantageously effected at the very moment of the formation of the nitric anhydrid, in the presence of the solution, by the reaction between peroxid of nitrogen and ozone. The nitrogen peroxid may be introduced in any physical form, but to facilitate the control, preferably in the form of vapor. The ozone may be used in any form. The ozone and the $NO_2$ may be fed in any desired proportions, but losses will occur if either reagent be in excess of the other, and consequently theoretical proportions result in economy.

The following is an example of suitable procedure:—

Into the aqueous nitric acid which is to be converted into concentrated nitric acid and which may be of any desired or available strength is passed a gaseous current of ozonized oxygen or air and nitrogen peroxid. Gaseous nitric anhydrid ($N_2O_5$) is formed and this reacts at once with the water of the solution of nitric acid yielding more nitric acid; the operation is continued until the liquid has attained the desired degree of concentration.

Having thus described the nature of the said invention and the best means I know of carrying the same into practical effect, I claim:—

1. A process for the manufacture of concentrated nitric acid by causing an aqueous solution of nitric acid to react with nitric anhydrid at the moment of its formation, formed in immediate proximity to the solution by the reaction between nitric peroxid and ozone.

2. The process of manufacturing nitric anhydrid which consists in treating nitrogen peroxid with ozone.

3. The process of manufacturing concentrated nitric acid which consists in treating nitrogen peroxid with ozone in the presence of a more dilute aqueous solution of nitric acid.

4. The process of manufacturing concentrated nitric acid which consists in treating nitrogen peroxid with ozone to form nitric anhydrid and treating said anhydrid, at the moment of its formation, with an aqueous solution of nitric acid.

In testimony whereof I have signed my name to this specification in the presence of two subscribing witnesses.

PHILIPPE AUGUSTE GUYE.

Witnesses:
     LOUIS M. MUNIEZ,
     J. DIVONE.